United States Patent Office 2,724,652
Patented Nov. 22, 1955

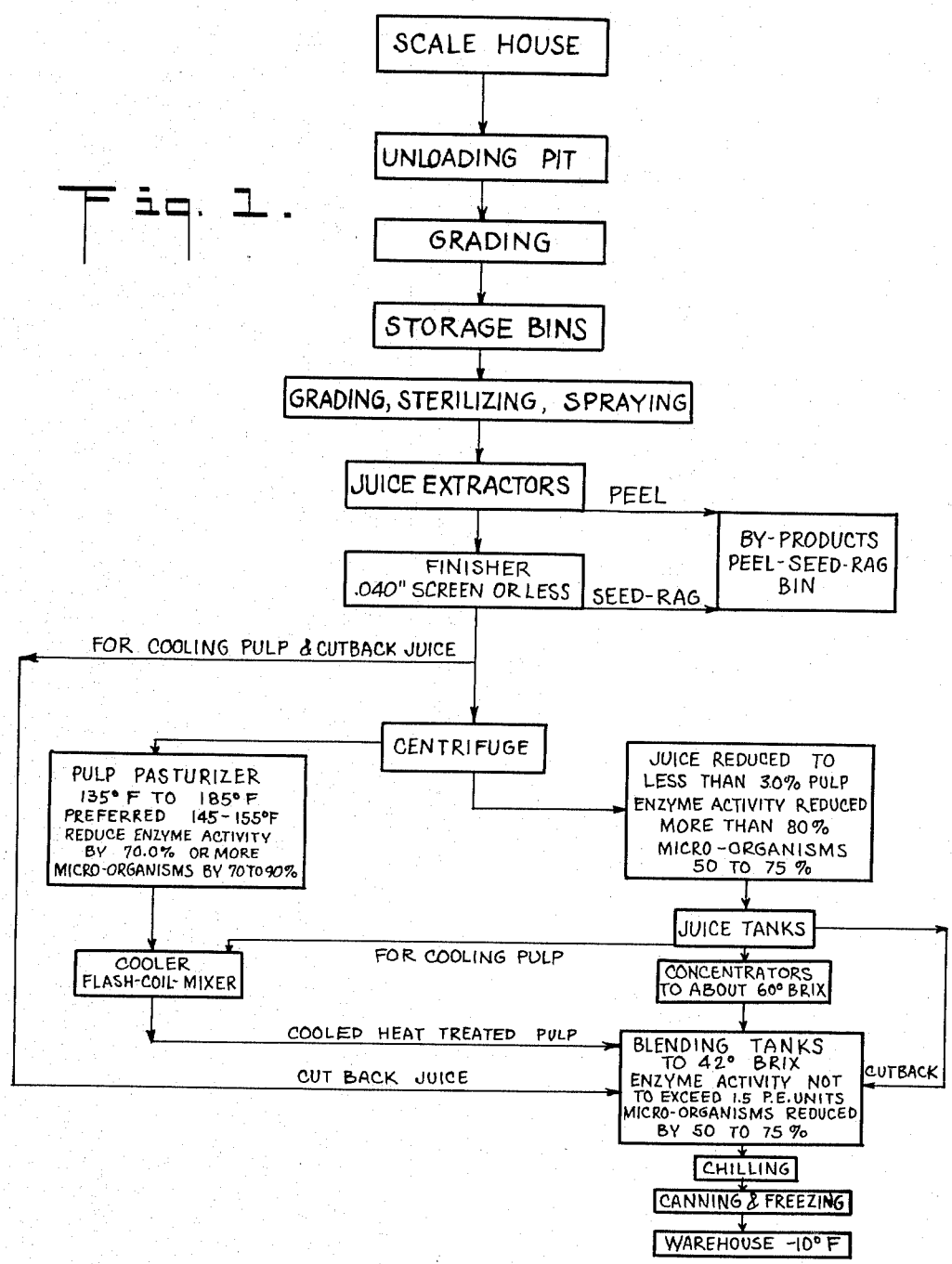

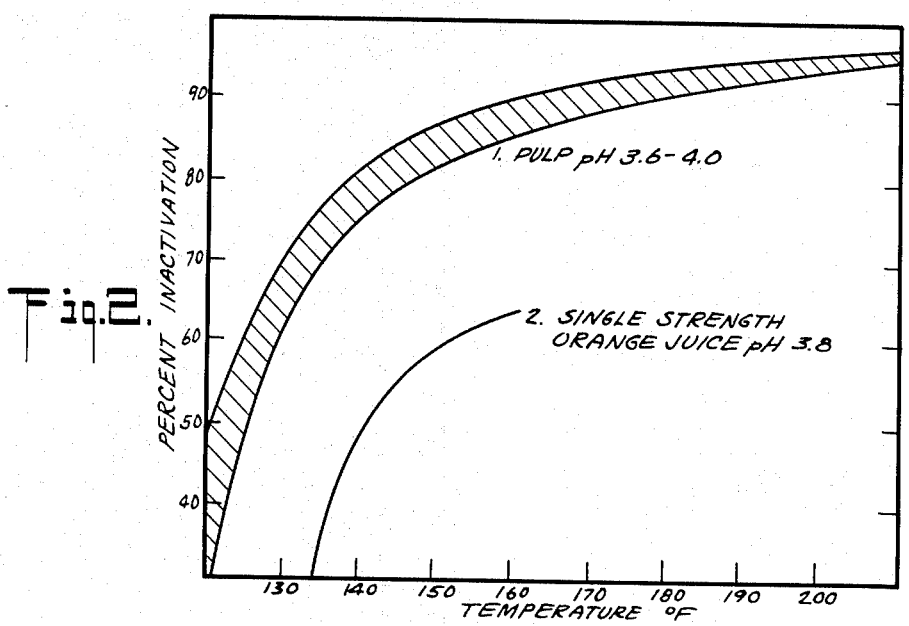
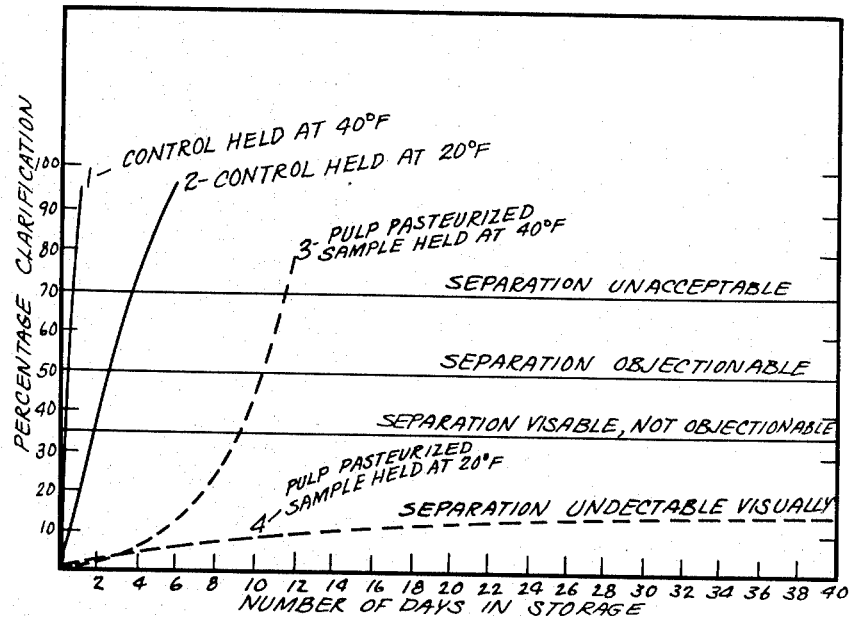

---

2,724,652

METHOD OF PRODUCING FROZEN CITRUS CONCENTRATE OF IMPROVED STABILITY

Jewell Allen Brent, Wallace W. Brown, and Wallace R. Roy, Orlando, Fla., assignors to Minute Maid Corporation, New York, N. Y., a corporation of Florida Application July 23, 1952, Serial No. 300,481

14 Claims. (Cl. 99—205)

This invention relates to concentrated products from citrus juices, especially orange juice, and is more particularly concerned with a method of producing a frozen citrus juice concentrate of improved stability and storage life characteristics.

Frozen concentrated citrus juices are now well known commodities, despite the fact that some of the problems related to their preparation and storage have hitherto been only incompletely solved. These problems include primarily those bearing on the flavor of the product and on its shelf life in storage, both from the standpoint of flavor and separation. Such concentrated juices are normally stored in a frozen condition at relatively low temperatures such as between −10° and 20° F. and below and are intended to be diluted with water before consumption to make a product having a concentration of the original whole fruit juice. The frozen concentrates are kept at the above designated low temperatures from the time they are canned through the various steps of storage while awaiting shipment, transportation, and storage on the shelves of distributors and dealers. When they reach the hands of the consumer they are frequently stored for longer or shorter periods at normal refrigerator temperatures of approximately 40° F. Concentrates made by the methods heretofore practiced have, when used after handling such as described above, at times exhibited tendency to pulp separation and off-flavor characteristics which have seriously detracted from public acceptance of the product.

An object of our invention is to produce a frozen citrus concentrate which, on dilution after customary handling, retains the taste of the fresh citrus juice to an extent hitherto not obtainable. A further object of our invention is to produce a frozen citrus concentrate which, on dilution after normal handling, will be free from objectionable separation. Other objects of our invention will become clear from the specification.

It has been suggested that the liquid and pulp be separated before concentration of the former, and that the further steps of concentrating the liquid be carried out at a temperature high enough to sterilize it, while subjecting the pulp to a lower temperature. We have now found that if one separates the liquid from the pulp he can thereafter pasteurize the pulp and concentrate the liquid under a relatively high vacuum at a low temperature, avoiding high temperature sterilization of the liquid and obtain a final product, by blending back the pasteurized pulp with the concentrated liquid, which meets the rigid requirements of unimpaired flavor and good stability in storage and normal use, with freedom from fermentation, separation and other undesirable effects.

Apparently the pasteurizing of the pulp destroys the major portion of the enzymes and appreciable quantities of the micro-organisms which tend to bring about undesirable adjuncts to storage and the flavor is not impaired to any appreciable extent.

The following description is an example of our new process as applied to orange juice.

In carrying out our improved process we first perform the conventional steps of inspection, washing, sterilization, rinsing, and extraction of the juices from the oranges, all of them by essentially standard procedure. The peel from the extractors goes to by-products and the juice to a finisher, separator or centrifuge to separate from the whole juice the seed, rag and suspended particles which will not pass through a screen with a .040″ opening. We then centrifuge or screen the whole juice to separate the pulp from the liquid. We adjust our conditions of centrifuging or screening so that the pulp content of the supernatant liquid is reduced to 3% or less by volume and the enzyme activity of the supernatant liquid is reduced by at least 80%. The pulp content is measured by centrifuging a sample of the juice for 10 minutes at room temperature using a clinical centrifuge with an 8″ diameter head at a speed of 1800 R. P. M. using 50 ml. sample tubes and reading the volume of precipitated pulp as per cent by volume of the pulp content of the sample. At the same time, the micro-organism content of the liquid is reduced by 25 to 50% of the original content by entrainment with the pulp. During this separation step, there is no decrease in the total amount of micro-organisms and enzymes present, the reduction of content of these materials in the liquid being entirely due to their distribution between the liquid and the pulp. We then process the liquid and the pulp as follows: The liquid is concentrated in a double-effect evaporator. The pulp-free juice is first fed into the so-called second effect, where its bulk temperature is raised to 58° F. The pressure in this effect is approximately 10 to 11 millimeters absolute. The juice, after being partially concentrated under these conditions, to which it is subjected for about 5 to 10 minutes, is passed to the so-called first-effect evaporator where its bulk temperature is raised to 78° F., a pressure of 18 to 19 millimeters absolute being maintained. The residence time is approximately 5 to 10 minutes. The resulting concentrate is approximately 60° Brix. This concentration may be 50 to 55° Brix.

In the meantime, we subject the pulp to a pasteurization treatment by heating it at a temperature of 135 to 185° F. for a period of time from a fraction of a minute up to 3 minutes, preferably in the range of 145 to 155° F. for a period of time of less than ½ minute. We have found that the pulp so treated is unaffected in its taste or physical characteristics while its enzyme activity is reduced by 70% or more and its micro-organism content reduced by at least 70 to 90%. We then quickly cool the heat treated pulp. We prefer flash cooling. We may, however, to cool the pulp, add the separated juice or such quantities of fresh untreated juice as are ordinarily added to concentrate, or we may use any other method.

We then incorporate the heat treated, cooled pulp, into the concentrated separated juice if cooling has not been brought about by such addition, and the whole is adjusted to final (42° Brix) concentration with fresh untreated juice or centrifuged or separated juice as needed.

The final product by our method, after being blended back to 42° Brix, has an enzyme activity of 1.5 P. E. units or less, when tested by a modification of the well known method of Kertesz. By this method 25 ml. of a 1% pectin solution is added to the juice and the pH adjusted to 7.5 with sodium hydroxide at 30° F. The number of milliliters of standardized sodium hydroxide required to maintain the solution at a pH of 7.5 for 3 minutes is then determined and the P. E. number is calculated as follows:

$$\frac{\text{ml. NaOH} \times \text{N. NaOH}}{\text{Brix of sample} \times \text{ml. of sample} \times 3 \text{ min}} \times 10^{-4} = \text{Number of P. E. units}$$

Figure 1 is a flow sheet showing the various processing steps in our new method.

Figure 2 shows the inactivation of pectinesterase we obtain by heat treating the pulp as compared with that obtainable by heat treating the single strength orange juice.

Figure 3 is a graphic comparison of the result obtainable by our process as compared with that obtainable by mere concentration. All the curves in Figure 3 refer to 42° Brix concentrate. The percentage clarification, which is a measure of the instability of the juice, is determined as follows. 12° Brix juice is placed in a 50 ml. centrifuge tube and spun for 10 minutes at 1800 R. P. M. using a centrifuge with a diameter of 8 inches. The supernatant liquid is then placed in a Lumitron Colorimeter and its optical density is determined, using a #650 filter. The initial optical density before any separation has taken place is also determined. The percentage clarification during storage is then determined by the following equation:

$$\frac{\text{Initial optical density} - \text{Final optical density}}{\text{Initial optical density}} \times 100 = \text{percentage clarification}$$

The percentage clarification has been correlated with various amounts of separation as shown by the solid horizontal lines on Figure 3. It will be noted that the pulp pasteurized sample held at 20° F. is stable for a prolonged period of time, so far as separation is concerned. The pulp pasteurized sample can be held at 40° F. for ten days before separation becomes objectionable. On the other hand, objectionable separation of the control sample begins at about two days even when held at 20° F., and at 40° F. the control sample shows unacceptable separation in less than one day.

As will be seen from the above, quick frozen concentrate product prepared by our new method has improved stability as regards separation. It also has resistance to development of off or aged flavors and significantly improved micro-organism content. Our new process also has the advantage of heat treatment with minimum (about 5% by weight) exposure of the ingredients of the juice to the action of heat, since we subject only the separated pulp to heat treatment. We have also found that the supernatant or centrifuged juice, being substantially free from suspended matter, can be concentrated more rapidly and to higher degrees of concentration. The low temperatures at which we are able to concentrate the liquid fraction, and yet obtain a stable mixture on adding the pasteurized pulp fraction, insures a final concentrated product in which the taste and aroma are indistinguishable, when rediluted, from those of the fresh whole juice. We thus avoid off-flavor, which is characteristic of processes involving the use of sterilization temperatures on the liquid, for however short a time. We also avoid flavor difficulties encountered as a result of chemical treatment of the pulp fraction.

While we have described our process as applied to orange juice, it should be understood that it is also applicable to other citrus juices, or other juices, by making appropriate modifications in the degrees Brix at the various stages, without departing from our invention.

Having described our new method of producing concentrated citrus juice, we claim:

1. A process of concentrating orange juice which comprises separating the juice into a pulp fraction and a liquid fraction containing less than 3% pulp, pasteurizing the pulp fraction by maintaining it at a temperature between 135 and 185° F. for not more than 3 minutes, cooling the pasteurized pulp fraction, concentrating the liquid fraction to approximately 60° Brix at a temperature below sterilization temperature, mixing the cooled pasteurized pulp fraction with the concentrated liquid fraction.

2. A process of concentrating orange juice which comprises separating the juice into a pulp fraction and a liquid fraction containing less than 3% pulp, pasteurizing the pulp fraction by maintaining it at a temperature between 135 and 185° F. for not more than 3 minutes, concentrating the liquid fraction to approximately 60° Brix at a temperature below sterilization temperature, mixing the cooled pasteurized pulp fraction with the concentrated liquid fraction.

3. A process of concentrating orange juice which comprises separating the juice into a pulp fraction and a liquid fraction containing less than 3% pulp, pasteurizing the pulp fraction by maintaining it at a temperature between 135 and 185° F. for not more than 3 minutes, concentrating the liquid fraction at a temperature below sterilization temperature and mixing the cooled pasteurized pulp fraction with the concentrated liquid fraction.

4. A process of concentrating orange juice which comprises separating the juice into a pulp fraction and a liquid fraction, pasteurizing the pulp fraction by maintaining it at a temperature between 135 and 185° F. for not more than 3 minutes, concentrating the liquid fraction at a temperature below sterilization temperature, and mixing the cooled pasteurized pulp fraction with the concentrated liquid fraction.

5. A process of concentrating orange juice which comprises separating the juice into a pulp fraction and a liquid fraction containing less than 3% pulp, pasteurizing the pulp fraction by maintaining it at a temperature between 145 to 155° F. for not more than 3 minutes, concentrating the liquid fraction to approximately 60° Brix at a temperature below that at which sterilization takes place, and mixing the pasteurized pulp fraction with the concentrated liquid fraction.

6. A process of concentrating orange juice which comprises separating the juice into a pulp fraction and a liquid fraction, pasteurizing the pulp fraction by maintaining it at a temperature between 145 to 155° F. for not more than 3 minutes, concentrating the liquid fraction at a temperature below that at which sterilization takes place, and mixing the pasteurized pulp fraction with the concentrated liquid fraction.

7. A process of concentrating orange juice which comprises separating the juice into a pulp fraction and a liquid fraction, pasteurizing the pulp fraction by maintaining it at a temperature between 145 to 155° F. for less than ½ minute, concentrating the liquid fraction at a maximum temperature of not more than 125° F. and mixing the pasteurized pulp fraction with the concentrated liquid fraction.

8. A process of concentrating orange juice which comprises separating the juice into a pulp fraction and a liquid fraction, pasteurizing the pulp fraction, concentrating the liquid fraction at a temperature not above approximately 78° F. and mixing the pasteurized pulp fraction with the concentrated liquid fraction.

9. A process of concentrating orange juice which comprises separating the juice into a pulp fraction and a liquid fraction, pasteurizing the pulp fraction by maintaining it at a temperature between 135 and 185° F. for not more than 3 minutes, quickly cooling the pasteurized pulp fraction, concentrating the liquid fraction to approximately 60° Brix at a temperature not above approximately 78° F. and mixing the cooled pasteurized pulp fraction with the concentrated liquid fraction.

10. A process of concentrating orange juice which comprises separating the juice into a pulp fraction and a liquid fraction, pasteurizing the pulp fraction by maintaining it at a temperature between 145 and 185° F. for less than ½ minute, quickly cooling the pasteurized pulp fraction, concentrating the liquid fraction to approximately 60° Brix at a temperature not above approximately 78° F. and mixing the cooled pasteurized pulp fraction with the concentrated liquid fraction.

11. A process of concentrating citrus fruit juices which comprises separating the juices into a pulp fraction and a liquid fraction, pasteurizing the pulp fraction, quickly cooling the pasteurized pulp fraction, concentrating the liquid fraction at a temperature not above approximately 78° F., and mixing the cooled pasteurized pulp fraction with the concentrated liquid fraction.

12. A process of concentrating citrus fruit juices which comprises separating the juices into a pulp fraction and a liquid fraction, pasteurizing the pulp fraction, concentrating the liquid fraction at a temperature not above approximately 78° F. and mixing the pasteurized pulp fraction with the concentrated liquid fraction.

13. A process of concentrating juice which comprises separating the juice into a pulp fraction and a liquid fraction containing less than 3% pulp, pasteurizing the pulp fraction, concentrating the liquid fraction at a temperature below sterilization temperature and mixing the pulp fraction and the concentrated liquid fraction.

14. A process of concentrating juice which comprises separating the juice into a pulp fraction and a liquid fraction, pasteurizing the pulp fraction, concentrating the liquid fraction at a temperature below sterilization temperature and mixing the pulp fraction and the concentrated liquid fraction.

References Cited in the file of this patent

UNITED STATES PATENTS

| | | |
|---|---|---|
| 2,115,815 | Johnson | May 3, 1938 |
| 2,187,572 | Meinzer | Jan. 16, 1940 |
| 2,342,962 | Noyes | Feb. 29, 1944 |
| 2,453,109 | MacDowell | Nov. 9, 1948 |
| 2,647,059 | Wenzelberger | July 28, 1953 |